March 13, 1962  J. C. M. FROST  3,024,966
RADIAL FLOW GAS TURBINE ENGINE ROTOR BEARING
Filed April 18, 1955  3 Sheets-Sheet 1

INVENTOR
J. C. M. FROST
BY
*Mazbee & Legris*
ATTORNEYS.

March 13, 1962     J. C. M. FROST     3,024,966
RADIAL FLOW GAS TURBINE ENGINE ROTOR BEARING
Filed April 18, 1955     3 Sheets-Sheet 2

INVENTOR
J. C. M. FROST
BY
Maybee & Legris
ATTORNEYS

March 13, 1962 J. C. M. FROST 3,024,966
RADIAL FLOW GAS TURBINE ENGINE ROTOR BEARING
Filed April 18, 1955 3 Sheets-Sheet 3
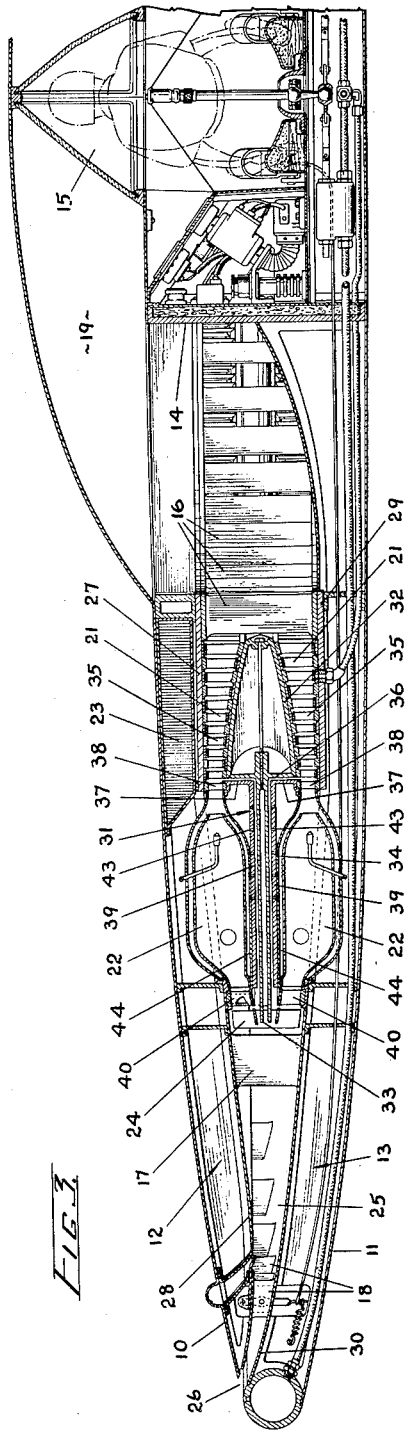
INVENTOR
J. C. M. FROST
BY
Maybee & Legris
ATTORNEYS.

United States Patent Office 3,024,966
Patented Mar. 13, 1962

3,024,966
RADIAL FLOW GAS TURBINE ENGINE ROTOR BEARING
John Carver Meadows Frost, Georgetown, Ontario, Canada, assignor, by mesne assignments, to Avro Aircraft Limited, Malton, Ontario, Canada, a corporation
Filed Apr. 18, 1955, Ser. No. 502,155
Claims priority, application Great Britain June 18, 1954
7 Claims. (Cl. 230—116)

This invention relates to the suspension of rotors in gas turbine engines and particularly to the suspension of rotors in gas turbine engines of the kind which form an integral part of aircraft of the general type disclosed in the co-pending patent application of John Carver Meadows Frost, Serial No. 376,320, filed on August 25, 1953.

As described in that application, the rotor is supported by roller bearings interposed between the rotor and the stator. However, due to the large area of the rotor and to its high speed of rotation and in order to avoid uneven running and vibration which may cause over-heating, it is necessary to work to very fine tolerances when machining and fitting the raceways and the bearing mountings. The high standard of workmanship, together with the large number of precision parts required, substantially increase production costs. By the present invention, the raceways and roller bearings are dispensed with.

It is the main object of the invention, therefore, to provide means for supporting the rotor of a radial flow gas turbine engine so that there is no metal-to-metal contact of bearing surfaces at the high linear velocities encountered during normal rotational speeds of the engine.

It is a further object of the invention to provide a rotor suspension which does not necessitate close manufacturing tolerances or unusual production methods and materials.

The invention is based on the principle that a fluid under pressure and constrained to flow through a pipe of constant cross-section experiences an increase in pressure and a decrease in velocity when it issues into a pipe the cross-sectional area of which is larger than that of the pipe in which it was originally constrained.

The foregoing and other objects and advantages of the invention will become apparent from a study of the following specification, taken in conjunction with the accompanying drawings, in which like reference characters indicate corresponding parts throughout the several views, and in which:

FIG. 3 is a radial sectional view of the said aircraft, taken substantially transversely of the direction of flight, and more particularly as indicated by lines 3—3 of FIG. 1.

Figure 1:
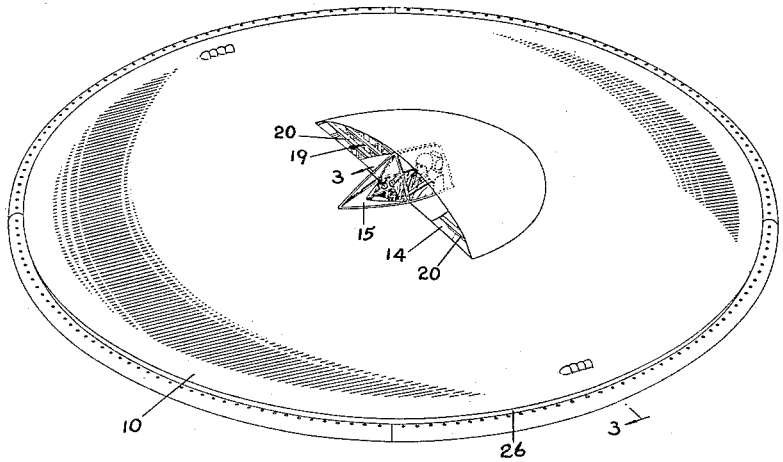
FIG. 1 is a perspective view of an aircraft of the kind which may be powered by an integral radial flow gas turbine engine incorporating a rotor suspension or bearing constructed in accordance with the invention.
Figure 4:
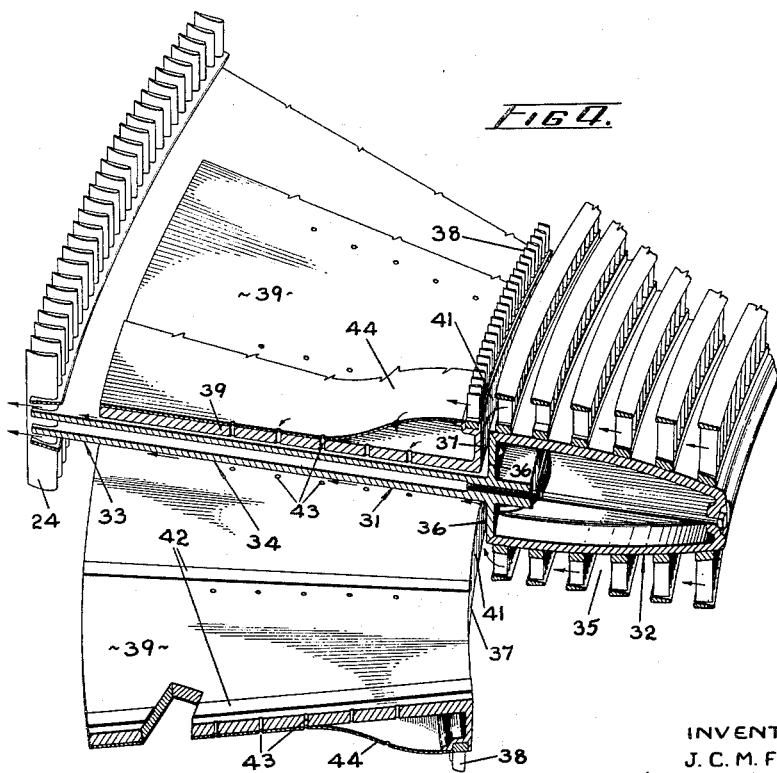
FIG. 4 is an enlarged fragmentary perspective view of a sector of the rotor and showing some of the surrounding stator structure.
Figure 2:
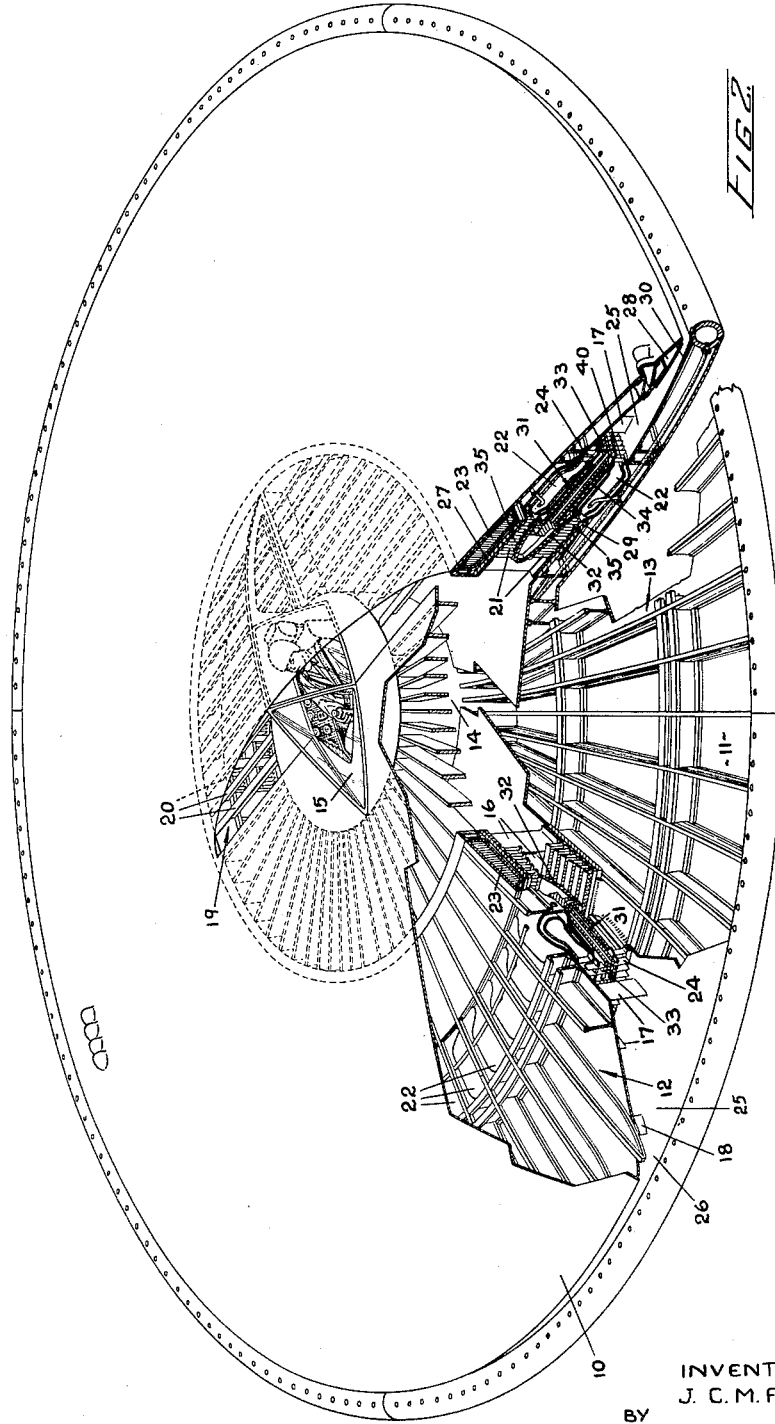
FIG. 2 is a perspective view of the said aircraft, partly broken away to show particularly the internal construction of the engine.

For greater convenience throughout the description and the claims certain terms of positional relationship are used; the terms "outboard" (or "outboardly") and "inboard" (or "inboardly") denote, respectively, greater and lesser distances from the axis of rotation of the rotor, and the terms "outer" and "inner" similarly denote greater and lesser distances from a medial plane of the aircraft coinciding with the plane of the rotor.

The opposed aerofoil surfaces of an aircraft of the kind in which an engine embodying the invention may be used are constituted by upper skin 10 and lower skin 11, supported respectively on the outer edges of an upper series of ribs and spacers generally indicated at 12 and a lower series of ribs and spacers generally indicated at 13. The two series of ribs and spacers and the skins which they support are secured together in spaced relationship by a central cylindrical shell 14 within which is a pilot's compartment 15, and by a circumferentially arranged group of inboard struts 16 and two circumferentially arranged groups of outboard struts 17 and 18. Air enters an inlet 19 which is provided by a central protuberance in the upper skin, is deflected downwardly by cascades 20, then after passing through a central plenum chamber it flows radially outboardly through a double-sided multi-stage compressor generally indicated at 21, then into an annularly disposed combustion system 22 where it supports combustion of the fuel supplied from an annular fuel tank 23. The products of combustion expand through a single stage radial flow turbine 24 into a peripheral passage 25 whence they flow radially outboardly through a perimetrical orifice 26 which forms a constituent part of a Coanda nozzle. To propel and stabilize the aircraft the direction of flow of the ejected air may be controlled selectively by the pilot through the operation of his controls which alter the operating characteristics of the Coanda nozzle, in the manner described in the co-pending United States patent application of John Dubbery, John Carver Meadows Frost and Thomas Desmond Earl, Serial No. 502,156, filed on April 18, 1955, now abandoned, but superseded by continuation application Serial No. 684,615, filed on September 17, 1957.

Secured to the inner edges of the upper series of ribs and spacers 12 are inboard disc 27 and outboard disc 28, and secured to the inner edges of the lower series of ribs and spacers 13 are inboard disc 29 and outboard disc 30; the inboard discs together with the ribs and spacers and also the struts in effect constitute the stator casing of the engine.

A rotor generally indicated at 31 and which in plan form is an annular disc is rotatably mounted within the stator casing, its plane of rotation approximately coinciding with the medial plane of the opposed aerofoil surfaces of the aircraft. For convenience, the rotor may be considered as consisting of three concentric ring portions, namely an inboard or compressor portion 32, an outboard or turbine portion 33, and an intermediate portion 34.

In radial cross-section the compressor portion 32 of the rotor is generally wedge-shaped, the thin edge of the wedge being substantially in line with a circumferential compressor inlet defined by the struts 16 and the thicker edge being substantially in line with the circumferential compressor outlet. The surfaces of the compressor portion of the rotor are spaced from the opposed surfaces of the stator casing, thus providing outboardly converging annular passages 35 at each side of the rotor. Concentric rings of blades of aerofoil cross-section with their longitudinal axes substantially parallel to the axis of rotation of the rotor are mounted in the annular passages, alternately on the compressor portion of the rotor and on the opposed portions of the stator casing, to form a double-sided multi-stage radial flow air compressor. Since the passages converge from their inboard periphery to their outboard periphery, the blades of each succeeding row decrease in length accordingly.

Immediately outboard of the last stage of the compressor there is a discontinuity in each of the heretofore continuous surfaces of the compressor portion 32 of the rotor, and the rotor suddenly becomes a disc of comparatively thin cross-section, which thin portion is the previously mentioned intermediate portion 34 of the rotor. The discontinuity in each of the surfaces of the compressor portion of the rotor is defined by a cylindrical surface or cylinder 36 which is coaxial with the axis of rotation of the rotor; this cylindrical surface provides the radial load bearing of the rotor. The axial load bearing of the rotor is provided by the annular surfaces of the intermediate rotor portion 34. The cylindrical surfaces 36 and the contiguous annular bearing surfaces of the rotor portion 34 together provide a stepped rotor wall.

Encompassing the cylinders 36 of the rotor and spaced therefrom very slightly are two cylindrical rings 37, one at each side of the rotor. The outer edge of each ring is secured firmly to the opposed portion of the stator casing by means of spaced circumferentially arranged vanes 38, which vanes extend across the circular zones which provide entrances to the combustion system 22. To the inner edges of the two rings 37 are firmly secured the contiguous inboard peripheries of annular bearing plates 39 located opposite the annular bearing surfaces of the rotor. The outboard peripheries of the bearing plates 39 are supported by circumferentially spaced fixed hollow vanes 40 located in the circumferential outlets of the combustion system 22. The cylindrical rings 37 and the contiguous annular bearing plates 39 together provide a stepped stator wall. The spacing between the two bearing plates is slightly greater than the spacing between the annular bearing surfaces of the rotor, so that when the rotor is located medially between the bearing plates (when the rotor is in operation) thin annular passages are provided between the bearing plates and the opposed annular bearing surfaces of the rotor.

Thus, the two annular bearing plates 39 in association with the opposed annular bearing surfaces of the rotor provide bearings which carry the axial load of the rotor on the stator casing, and the cylinders 36 of the rotor in association with the cylindrical rings 37 of the stator casing provide bearings which carry the radial load of the rotor on the stator casing. The spaces between the previously mentioned stepped walls provide continuous air passages having circumferentially arranged inlets 41 registering with the last stage of the compressor and having circumferential outlets whereby the air flowing through the passages may be exhausted to atmosphere through the turbine 24 and through the passages in the hollow vane 40.

Thin bars 42 are equiangularly arranged on the bearing plates 39 and are disposed radially on it. The bars project slightly above the surfaces of the bearing plates and provide rubbing strips for the rotor. The rubbing strips 42 are approximately ¼″ in width and preferably are set in retaining grooves provided in the bearing plates and which are of the order of ⅛″ in depth. The thickness of each rubbing strip is such that it projects above the surface of the bearing plate about .020″. Any material which has a low coefficient of friction and can withstand high temperatures and high bearing loads may be used for the rubbing strips, and it would appear from experiment that bars of solid carbon give the best results. A series of holes or ports 43 in direct communication with the air supply in flame tube jackets 44 of the combustion system 22 is provided in the bearing plates 39 adjacent the trailing edge of each rubbing strip, that is, on the side of the rubbing strip which may be said to represent the lee when taken in the direction of rotation of the rotor; each series of holes is arranged in a direction substantially parallel to the adjacent rubbing strip.

In operation, air is diverted from the last stage of the compressor 21 into the cylindrical passages between the cylinders 36 of the rotor and the opposed cylindrical rings 37 of the stator casing, and thence flows into the annular passages between the annular bearing plates 39 and the opposed annular bearing surfaces of the rotor. The air when flowing in the said annular passages initially flows radially outboardly, but this radially outboard flow has added to it a centrifugal component of motion due to the rotational forces of the rotor. The rotor is supported radially and axially by the cushion of air under pressure supplied by the compressor. The supply of air from the compressor is augmented by air fed from the flame tube jackets through the holes 43 in the bearing plates 39. This secondary air supply, although not essential during the running of the engine, is a useful additional source of pressure which becomes especially important during the starting and stopping operations.

The rubbing strips 42 which project above the surfaces of the bearing plates 39 in effect restrict the passages between the bearing plates and the opposed annular bearing surfaces of the rotor. Such restriction of the passages causes an increase in the air pressure in the passages beyond the leading edges of the rubbing strips, to the extent that a pressure of say 1 lb./sq. in. at the holes in the bearing plates is multiplied about six times under the action of the imparted rotational velocity within the bearing passages. The rotational velocity is reduced as the air approaches the narrow gaps formed by the rubbing strips in the bearing surfaces of the rotor, thereby causing an increase in pressure.

By the aforedescribed construction mechanical friction is reduced to a minimum when starting or stopping the engine, as the combination of a large bearing area with the pressure build-up caused at the rubbing strips enables the rotor to be "airborne" within one revolution. Except during the first revolution of starting and the last revolution of stopping there is no rubbing contact between the rotor and the stator, the entire load being carried by the cushion of air between the rotor and the stator, as described.

The forms of the invention herein shown and described are to be considered merely as examples, and various changes in the shape, size and arrangement of the parts may be resorted to without departing from the spirit of the invention or the scope of the subjoined claims. For convenience the invention has been described as embodied in the particular engine from the design of which the invention resulted, and which engine forms an integral part of the air-frame of an aircraft, but obviously the invention could be incorporated in other gas turbine engines.

What I claim as my invention is:

1. In a radial flow gas turbine engine having a compressor including an annular disc-like rotor mounted for rotation between two opposed members which provide a stator casing, a cylindrical surface of the rotor concentric with the rotor's axis of rotation, a complementary cylindrical surface of the stator casing slightly spaced from the rotor's cylindrical surface, means introducing air under pressure into the space between the two cylindrical surfaces for radially supporting the rotor when it rotates, annular bearing surfaces of the rotor at each side thereof, annular plates of the stator casing on each side of the rotor, the spacing between the said plates being slightly greater than the spacing between the rotor bearing surfaces so that when the rotor bearing surfaces are centred relative to the annular plates spaces are provided between the rotor bearing surfaces and the opposed bearing plates, and means introducing air under pressure into the spaces between the rotor bearing surfaces and the opposed annular plates for axially supporting the rotor when it rotates.

2. In a radial flow gas turbine engine having a compressor including an annular disc-like rotor mounted for rotation between two opposed members which provide a stator casing, a cylindrical surface of the rotor concentric with the rotor's axis of rotation, a complementary cylindrical surface of the stator casing slightly spaced from the rotor's cylindrical surface, annular bearing surfaces of the rotor at each side thereof, annular plates of the stator casing on each side of the rotor, the spacing between the said plates being slightly greater than the spacing between the rotor bearing surfaces so that when the rotor bearing surfaces are centred relative to the annular plates spaces are provided between the rotor bearing surfaces and the opposed bearing plates, the spaces between the opposed cylindrical surfaces and the spaces between the opposed rotor bearing surfaces and annular plates providing continuous passages, and means introducing air under pressure into the said passages for radially and axially supporting the rotor when it rotates.

3. In a radial flow gas turbine engine having a compressor including an annular disc-like rotor mounted for rotation between two opposed members which provide a stator casing, a cylindrical surface of the rotor concentric with the rotor's axis of rotation, a complementary cylindrical surface of the stator casing slightly spaced from the rotor's cylindrical surface, annular bearing surfaces of the rotor at each side thereof, anular plates of the stator casing on each side of the rotor, the spacing between the said plates being slightly greater than the spacing between the rotor bearing surfaces so that when the rotor bearing surfaces are centred relative to the annular plates spaces are provided between the rotor bearing surfaces and the opposed bearing plates, the spaces between the opposed cylindrical surfaces and the spaces between the opposed rotor bearing surfaces and annular plates providing continuous passages, and ducts connecting the passages to a supply of air compressed by the compressor, the said compressed air in the passages radially and axially supporting the rotor when it rotates.

4. In a radial flow gas turbine engine having a compressor and a turbine which include an annular disc-like rotor mounted for rotation between two opposed members which provide stator casings, the inboard portion of the rotor providing a rotor for the compressor and the outboard portion providing a rotor for the turbine, a cylindrical surface of the rotor at each side thereof and adjacent the outboard periphery of the compressor portion and concentric with the rotor's axis of rotation, complementary cylindrical surfaces of the members of the stator casing and encompassing the rotor's cylindrical surfaces while being slightly spaced therefrom, annular bearing surfaces of the rotor at each side thereof and intermediate the compressor portion and the turbine portion, and annular plates of each of the members of the stator casing and opposite the rotor bearing surfaces, the said plates being slightly spaced from the opposed bearing surfaces when the rotor is located medially between the said bearing surfaces, each rotor cylindrical surface with the contiguous annular bearing surface defining a rotor wall, each stator casing cylindrical surface with the contiguous annular plate defining a stator wall, the rotor walls and the opposed stator walls together providing passages therebetween, the passages having circumferentially arranged inlets connected to a supply of compressed air from the compressor and having circumferentially arranged outlets at their outboard peripheries, the compressed air blowing through the passages radially and axially supporting the rotor when it rotates.

5. In a radial flow gas turbine engine having a compressor and a turbine which include an annular disc-like rotor mounted for rotation between two opposed members which provide stator casings, the inboard portion of the rotor providing a rotor for the compressor and the outboard portion providing a rotor for the turbine, a cylindrical surface of the rotor at each side thereof adjacent the outboard periphery of the compressor portion and concentric with the rotor's axis of rotation, complementary cylindrical surfaces of the members of the stator casing and encompassing the rotor's cylindrical surfaces while being slightly spaced therefrom, annular bearing surfaces of the rotor at each side thereof and intermediate the compressor portion and the turbine portion, annular plates of each of the members of the stator casing and opposite the rotor bearing surfaces, the said plates being slightly spaced from the opposed bearing surfaces when the rotor is located medially between the said bearing surfaces, each rotor cylindrical surface with the contiguous annular bearing surface defining a rotor wall, each stator casing cylindrical surface with the contiguous annular plate defining a stator wall, the rotor walls and the opposed stator walls together providing passages therebetween, the passages having circumferentially arranged inlets connected to a supply of compressed air from the compressor and having circumferentially arranged outlets at their outboard peripheries, and radially disposed rows of ports in the annular plates and having their inlet ends connected to a supply of compressed air and their outlets connected to the passages, the said ports supplying additional compressed air to the passages.

6. In a radial flow gas turbine engine having a compressor and a turbine which include an annular disc-like rotor mounted for rotation between two opposed members which provide stator casings, the inboard portion of the rotor providing a rotor for the compressor and the outboard portion providing a rotor for the turbine, a cylindrical surface of the rotor at each side thereof adjacent the outboard periphery of the compressor portion and concentric with the rotor's axis of rotation, complementary cylindrical surfaces of the members of the stator casing and encompassing the rotor's cylindrical surfaces while being sligthly spaced therefrom, annular bearing surfaces of the rotor at each side thereof and intermediate the compressor portion and the turbine portion, annular plates of each of the members of the stator casing and opposite the rotor bearing surfaces, the said plates being slightly spaced from the opposed bearing surfaces when the rotor is located medially between the said bearing surfaces, each rotor cylindrical surface with the contiguous annular bearing surface defining a rotor wall, each stator casing cylindrical surface with the contiguous annular plate defining a stator wall, the rotor walls and the opposed stator walls together providing passages therebetween, the passages having circumferentially arranged inlets connected to a supply of compressed air from the compressor and having circumferentially arranged outlets at their outboard peripheries, radially disposed rows of ports in the annular plates and having their inlet ends connected to a supply of compressed air and their outlets connected to the passages, the said ports supplying additional compressed air to the passages, and raised radially disposed elements on the bearing plates, the radially disposed rows of ports being located adjacent the edges of the aforesaid elements which are the trailing edges with relation to the direction of rotation of the rotor.

7. In a radial flow gas turbine engine having a compressor and a turbine which include an annular disc-like rotor mounted for rotation between two opposed members which provide stator casings, the inboard portion of the rotor providing a rotor for the compressor and the outboard portion providing a rotor for the turbine, a cylinder secured to each side of the rotor adjacent the outboard periphery of the compressor portion and concentric with the rotor's axis of rotation, complementary cylindrical rings secured to each of the opposed stator casing members and having inner edges disposed adjacent each side of the rotor, the said rings encompassing respectively the rotor cylinders while being slightly spaced therefrom, annular rotor discs intermediate the compressor portion and the turbine portion, annular plates at each side of the rotor and opposite the rotor discs, the outboard peripheries of the plates being supported by the respective stator casing members, the inboard peripheries of the plates being fast on the inner edges of the cylindrical rings which are contiguous thereto so that each plate and the contiguous ring define a stepped stator wall, the plates being slightly spaced from the opposed rotor discs when the rotor is located medially between the plates, each rotor cylinder and the annular rotor disc which is contiguous thereto defining a stepped rotor wall, the aforesaid stepped rotor walls and the said stepped stator walls together providing passages therebetween, the said passages having circumferentially arranged inlets connected to a supply of air from the compressor and having circumferentially arranged outlets at their outboard peripheries, the compressed air in the passages radially and axially supporting the rotor when it rotates.

References Cited in the file of this patent

UNITED STATES PATENTS 2,623,353     Gerard ---------------- Dec. 20, 1955